United States Patent [19]
Lanctot

[11] Patent Number: 5,764,928
[45] Date of Patent: Jun. 9, 1998

[54] MICROPROCESSOR COMMUNICATION PROTOCOL IN A MULTIPROCESSOR TRANSMITTER

[75] Inventor: Jane B. Lanctot, Minneapolis, Minn.

[73] Assignee: Rosemount Inc., Eden Prairie, Minn.

[21] Appl. No.: 794,395

[22] Filed: Feb. 5, 1997

Related U.S. Application Data

[63] Continuation of Ser. No. 316,417, Sep. 30, 1994, abandoned.

[51] Int. Cl.$^6$ .................................................. G06F 13/14
[52] U.S. Cl. ........................................ 395/285; 395/200.67
[58] Field of Search ............................... 395/285, 286, 395/200.47, 200.49, 200.6, 200.67, 750

[56] References Cited

U.S. PATENT DOCUMENTS

| | | | |
|---|---|---|---|
| 4,153,945 | 5/1979 | Actor et al. | 395/184.01 |
| 4,284,977 | 8/1981 | Yucius et al. | 340/825.22 |
| 4,547,849 | 10/1985 | Louie et al. | 395/823 |
| 4,698,746 | 10/1987 | Goldstein | 395/293 |
| 4,787,028 | 11/1988 | Finfrock et al. | 395/285 |
| 5,167,024 | 11/1992 | Smith et al. | 395/375 |
| 5,170,473 | 12/1992 | Ishida | 395/293 |
| 5,187,780 | 2/1993 | Clark et al. | 395/286 |
| 5,274,797 | 12/1993 | Barlow et al. | 395/183.22 |
| 5,276,807 | 1/1994 | Kodama et al. | 395/309 |
| 5,309,567 | 5/1994 | Mizukami | 395/290 |
| 5,311,509 | 5/1994 | Heddes et al. | 370/60 |
| 5,325,529 | 6/1994 | Brown et al. | 395/200 |
| 5,379,382 | 1/1995 | Work et al. | 395/883 |

OTHER PUBLICATIONS

"Designing with Microprocessors" Lawrence E. Getgen pp. 21–36 1985.

*Measurement Technology In Practice/The Digitisation of Field Instruments*, 1207a Journal A, vol. 32 (1991) Oct., No. 3, Antwerp, BE, pp. 62–65.

*Model 3095 Flow Transmitter*, Preliminary Product Information, Sep. 1993.

*Primary Examiner*—Jack B. Harvey
*Assistant Examiner*—Paul R. Myers
*Attorney, Agent, or Firm*—Westman, Champlin & Kelly, P.A.

[57] ABSTRACT

A communications protocol operable in a multi-processor transmitter environment that facilitates communication between the microprocessors is provided. The transmitter includes a sensor module having a sensor microprocessor and a sensor memory. The sensor module digitizes and compensates sensed process variables. The transmitter also includes an electronics module having an electronics microprocessor wherein the sensor and electronics microprocessors each include individually controllable output pins and individually readable input pins. The sensor and electronics microprocessors are connected by an interface having a bus system. The communications protocol comprises a set of instructions formed into procedures. The procedures include a sensor update procedure; a receive data procedure; a send data procedure; a send command procedure; an indexed read procedure; and a read memory direct procedure.

13 Claims, 4 Drawing Sheets

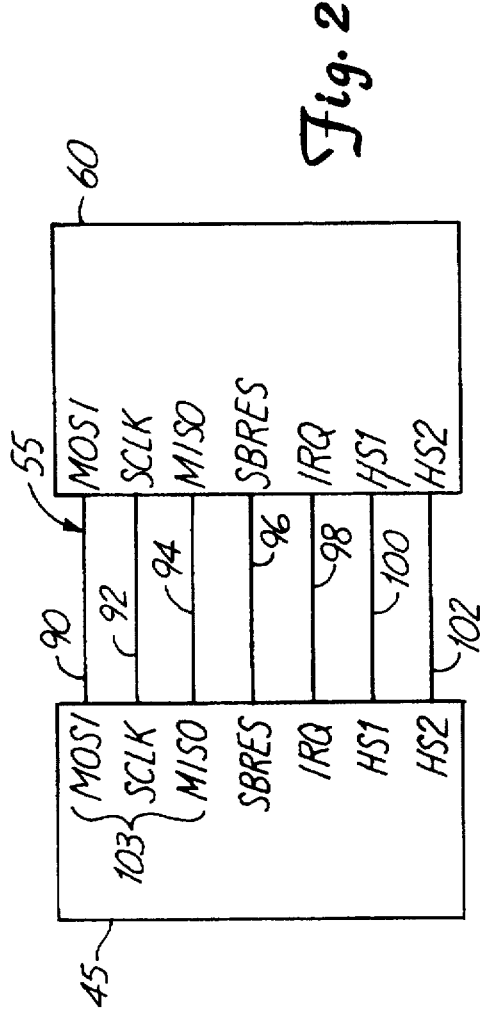
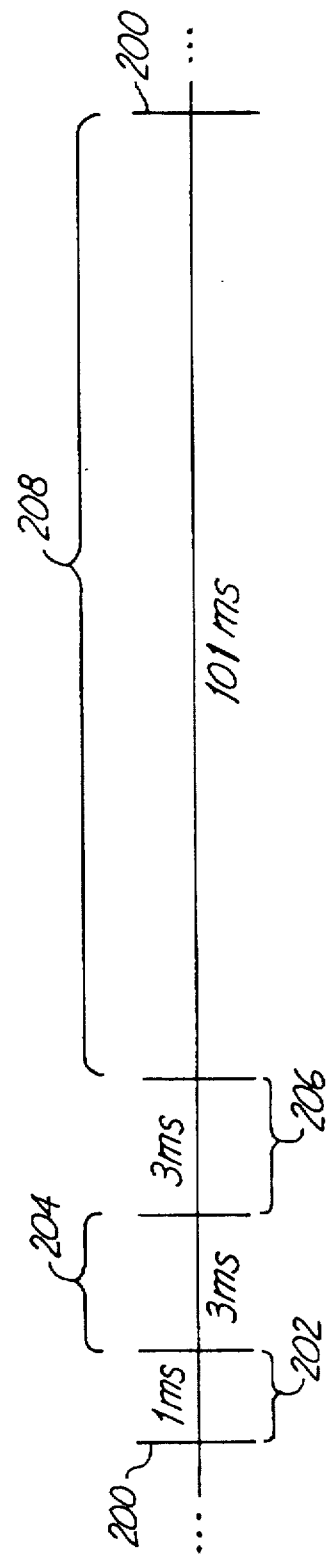

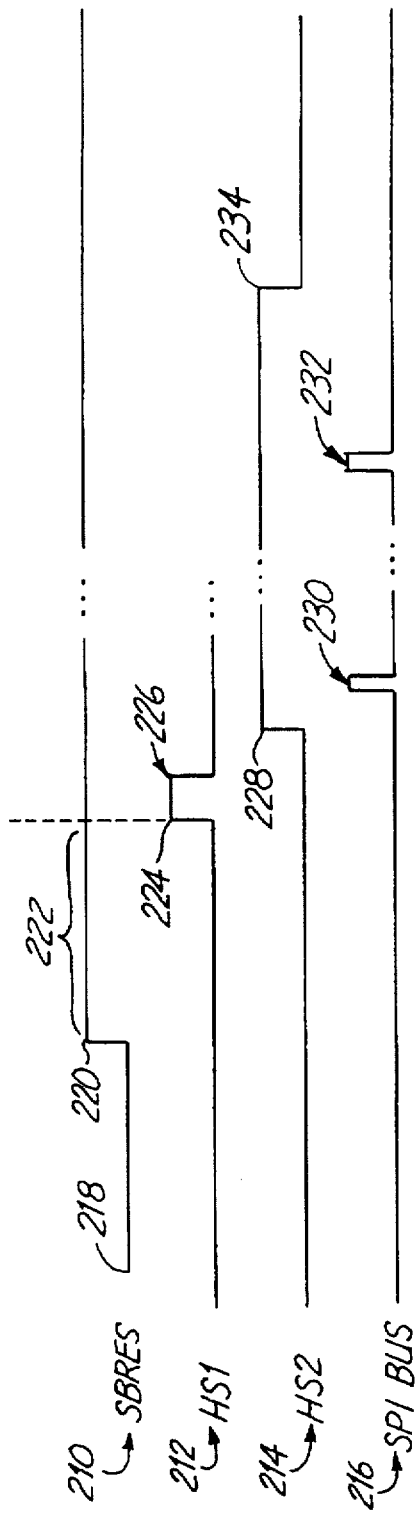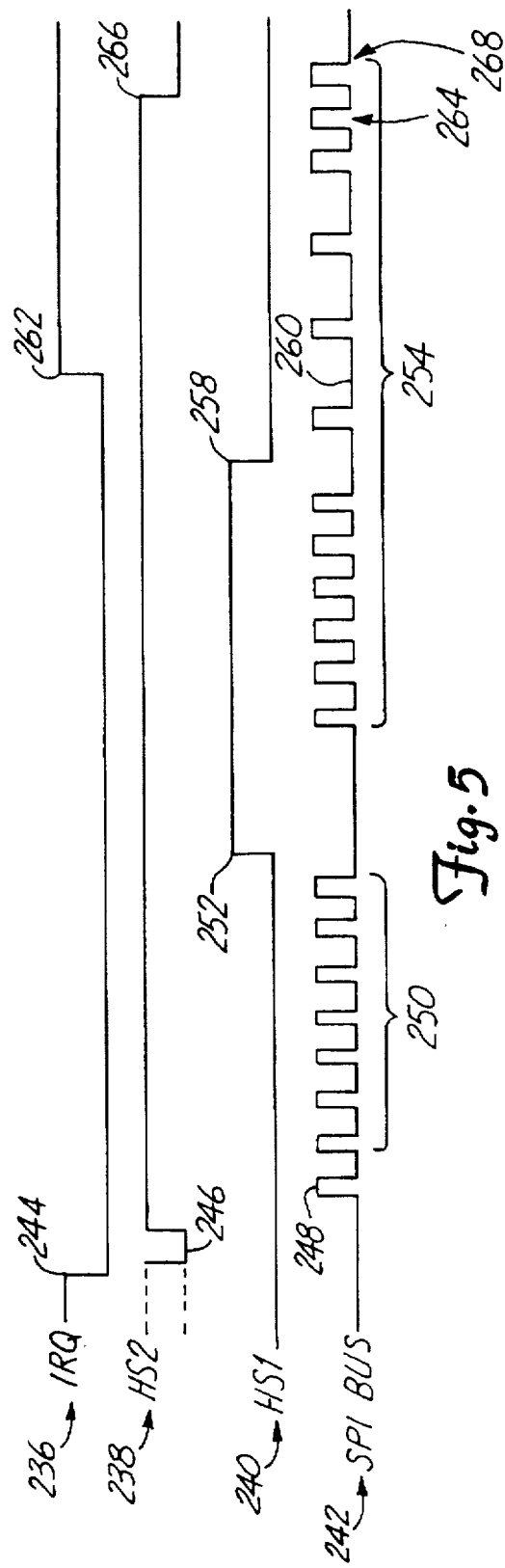

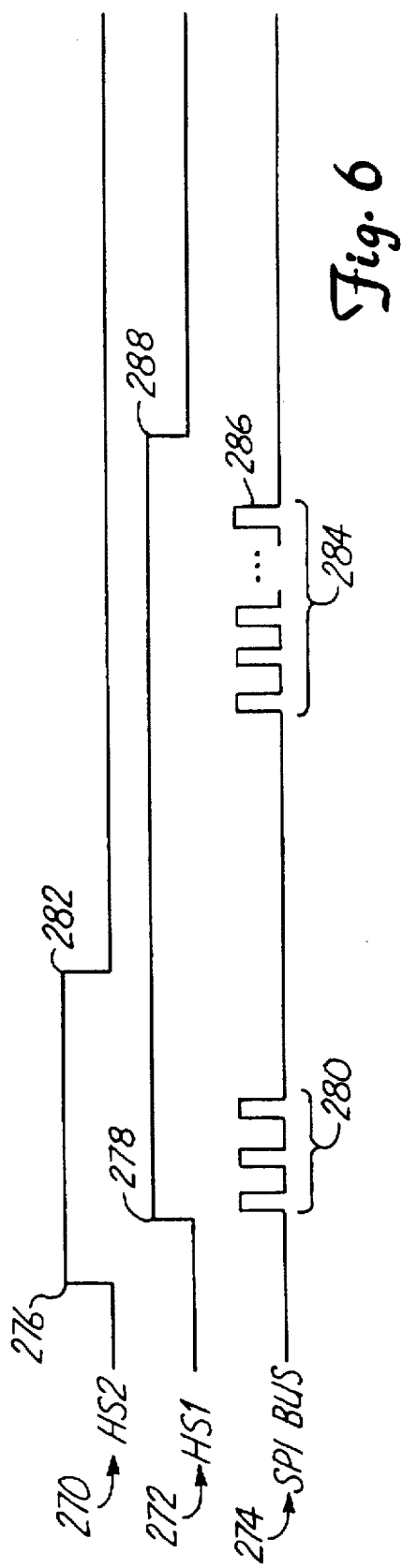
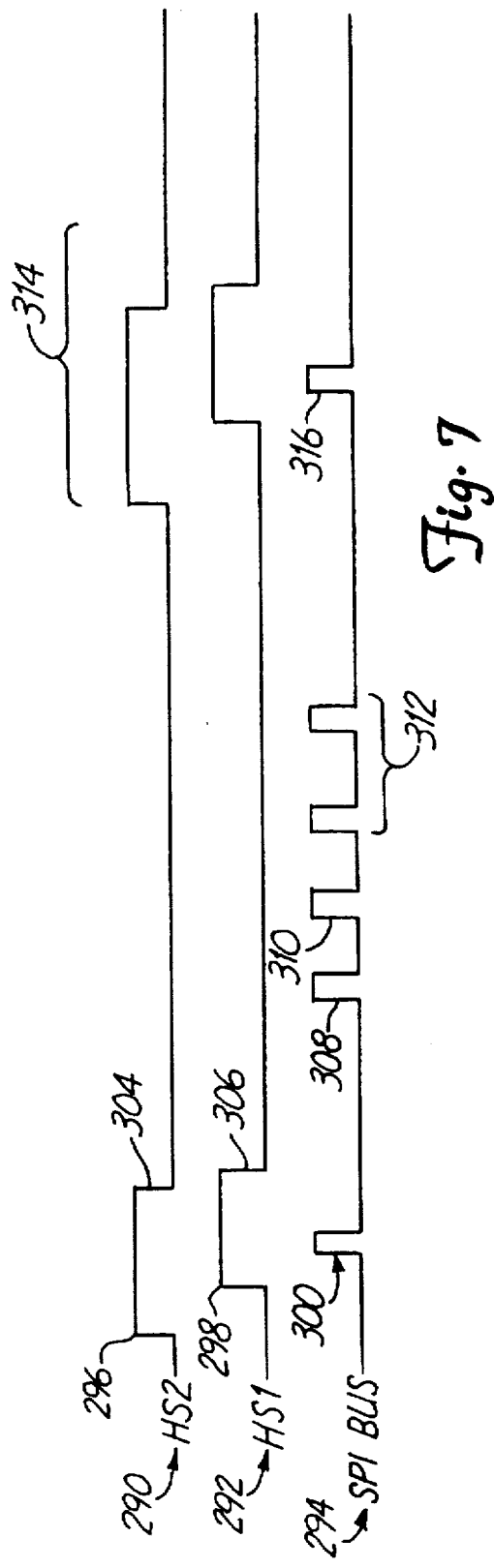

MICROPROCESSOR COMMUNICATION PROTOCOL IN A MULTIPROCESSOR TRANSMITTER

This is a continuation of application Ser. No. 08/316,417, filed Sep. 30, 1994 now abandoned.

BACKGROUND OF THE INVENTION

This invention relates to a field mounted measurement transmitter measuring a process variable representative of a process. More particularly, the present invention relates to software used in such transmitters that have two microprocessors.

Measurement transmitters sensing process variables, such as differential pressure, absolute pressure and process temperature, are known. The transmitters typically are mounted in the field of a process control industry installation. Measurement transmitters provide an output representative of sensed process variables. This output is then provided, typically over a two wire current loop, to a remote control room where the output can be processed further. The transmitter is powered by the current loop, so that the transmitter must fully operate on less current than the minimum current available on the loop.

Transmitters are provided as either a conventional analog instrument or microprocessor-based instrument. The extensive use of application-specific integrated circuits and surface-mount electronic technologies has significantly reduced the size and weight of the microprocessor-based transmitters in relation to analog transmitters. Microprocessor-based transmitters actually perform the same measurements and computing functions of larger analog transmitters.

In microprocessor-based transmitters, the microprocessor performs necessary calculations, data logging, output control functions, all tasks related to measuring and correcting the process variables, and the like. Often times, the microprocessor cannot perform more than one of these functions at once. Instead, the microprocessor must time-share these tasks. The throughput of the transmitter is adversely affected by time sharing.

In order to improve throughput, two microprocessors can be used in a single transmitter. One microprocessor is mounted in a sensor module and a second microprocessor is mounted in an electronics module. The sensor module performs all tasks related to measuring and correcting the sensed process variables. The electronics module performs all necessary calculations, data logging, and output control functions. With two microprocessors, the transmitter throughput and available functions are greatly enhanced over single microprocessor-based transmitters.

A dual microprocessor configuration also includes added benefits over a single microprocessor transmitter. For example, there is a manufacturing convenience in separating the two modules and marketing the sensor module and the electronics module separately. Separating the sensor module from the electronics module also facilitates modularity. For example, a single sensor module from a group of sensor modules can be used with a single electronics module from a group of electronics modules to provide a custom tailored and application specific transmitter. In order for the sensor module to function with the electronics module, however, the two microprocessors must be connected electronically and be able to communicate with one another, but the current consumption of the transmitter must be minimized.

SUMMARY OF THE INVENTION

The present invention is directed to a communication protocol operable in a multi-processor transmitter environment that facilitates communication between the microprocessors. The transmitter includes a sensor module having a sensor microprocessor and a sensor memory. The sensor module digitizes and compensates sensed process variables. The transmitter also includes an electronics module having an electronics microprocessor wherein the sensor and electronics microprocessors each include individually controllable output pins and individually readable input pins. The sensor and electronics microprocessors are connected by an interface having a bus system.

The communications protocol comprises a set of instructions formed into procedures. The procedures include a sensor update function; a receive data function; a send data function; a send command function; an indexed read function; and a read memory direct function.

BRIEF DESCRIPTION OF THE DRAWINGS

FIG. 2 is a more detailed view of a portion of the system of FIG. 1.

FIG. 3 is a timing diagram of an operational example of the present invention.

FIG. 4 is another timing diagram of another operational example of the present invention.

FIG. 5 is another timing diagram of another operational example of the present invention.

FIG. 6 is another timing diagram of another operational example of the present invention.

FIG. 7 is another timing diagram of another operational example of the present invention.

DETAILED DESCRIPTION OF THE PREFERRED EMBODIMENTS

1. System Context of the Invention

Figure 1:
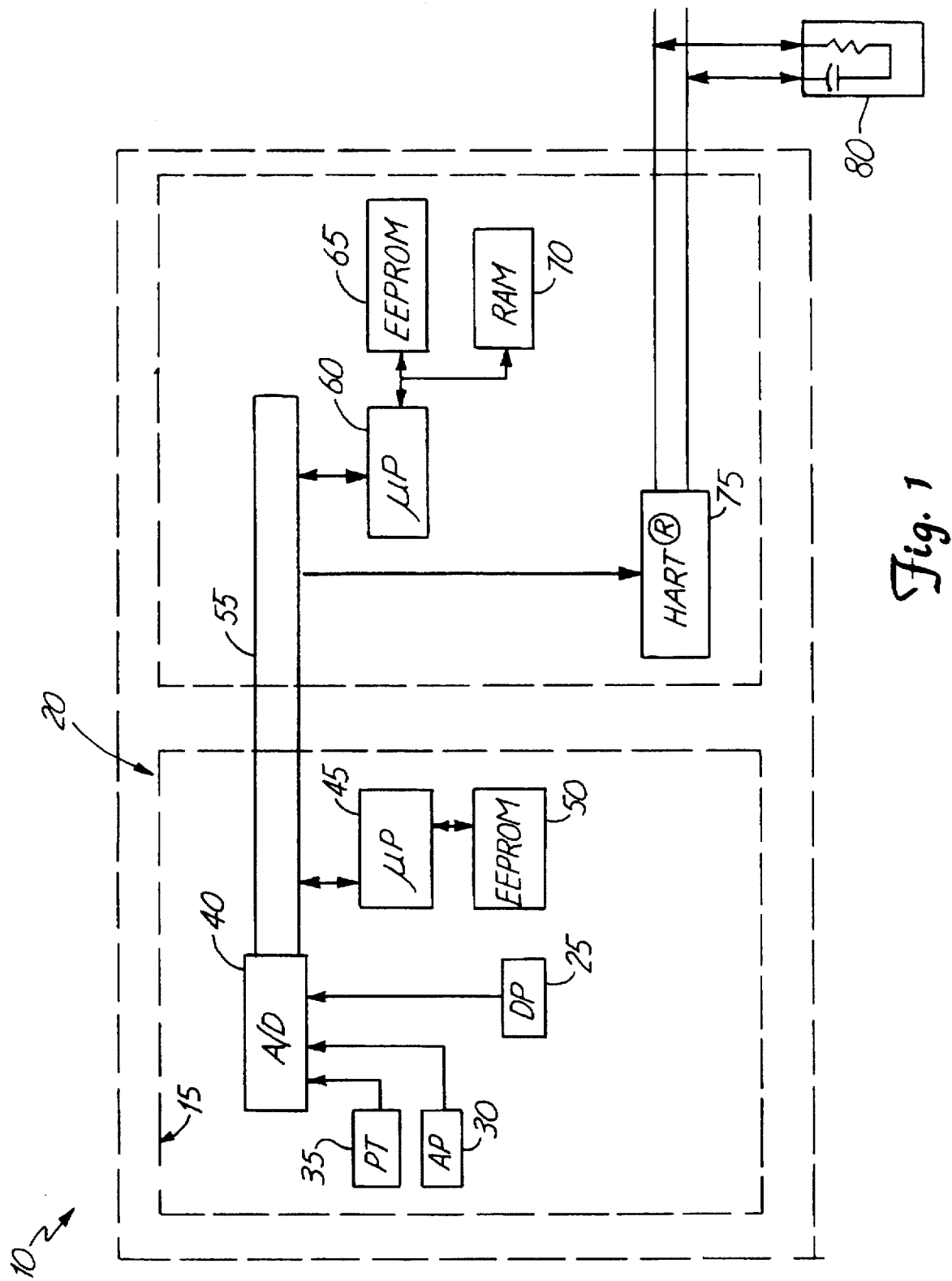
FIG. 1 is a block diagram of a system employing the present invention.

FIG. 1 shows a functional block diagram of a dual microprocessor transmitter system indicated generally at 10. The transmitter 10 is functionally divided between a sensor module 15 and an electronics module 20. The sensor module 15 performs all tasks related to measuring and compensating process variables. The electronics module 20 performs necessary calculations, data logging, and output control functions.

The sensor module 15 can preferably measure multiple process variables simultaneously. The "Multivariable™" sensor module 15 as shown in FIG. 1 incorporates a differential pressure sensor 25, an absolute pressure sensor 30 and a process temperature sensor 35. Sensors 25, 30 and 35 sense the process variables and provide analog output signals indicative of the sensed process variable. The analog output signals from process variable sensors 25, 30, and 35 are converted by an analog-to-digital converter 40 into digitized process variables. A sensor microprocessor 45 located inside the sensor module 15 linearizes and corrects the digitized process variables. To ensure premium performance, the sensor microprocessor 45 preferably uses the absolute pressure measurement to compensate for zero line pressure effects and an internal temperature measurement to compensate for thermal effects.

During manufacturing and testing at the factory, the sensor modules 15 are cycled through pressure and temperature cycles over the complete operating range of the transmitter 10. Correction coefficients generated from these cycles are stored in a sensor module memory 50 which comprises a non-volatile EEPROM memory. The correction coefficients are retained in the transmitter 10 when power to the transmitter is interrupted, so the transmitter can function upon power-up. The correction coefficients are used to correct and linearize the signals indicative of the process variables before they are sent to the electronics module 20.

A ten pin interface connector 55 connects the sensor module 15 to the electronics module 20. The major functions of the electronics module 20 are to process signals indicative of the variables, log data in memory, and provide an output for communications. These tasks can be accomplished by a single electronics board incorporating application specific integrated circuits and surface-mount technology. The main components of the board are the electronics microprocessor 60, a nonvolatile memory 65 for logging data, a random access memory (RAM) 70, and a modem 75 which typically employs the HART® communications protocol in transferring data between the electronics module 20 and a remote location 80. The electronics module 20 sends the three corrected digital process variables from the sensor module 15. The electronics module 20 converts the digital signal to the protocol for communication with the remote location 80 and arbitrates user interface software for communication with the remote location 80.

The electronics microprocessor 60 controls the operation of the transmitter 10. In addition, the electronics microprocessor 60 performs calculations, sensor linearization, engineering unit conversion, transmitter self-diagnostics, and digital communication. The electronics non-volatile memory 65 comprises an EEPROM which holds all transmitter configuration data.

The electronics memory 65 also can hold range values and store all data relating to large values. The data in the electronics memory 65 remains intact even when no power is applied. The RAM 70 is a temporary work space used by the electronics microprocessor 60 when performing calculations.

The sensor microprocessor 45 and the electronics microprocessor 60 are preferably manufactured by Motorola of Schaumburg, Ill. Preferably, the sensor microprocessor 45 is a Motorola Model 68HC05 microprocessor. Also, the electronics microprocessor 60 preferably is a Motorola Model 68HC11 microprocessor.

The sensor module 15 can be separated from the electronics module 20. Specifically, as shown in FIG. 2, the sensor microprocessor 45 is connected to the electronics microprocessor 60 with the interface connector 55. The interface connector 55 comprises multiple pins. Pins 90, 92 and 94 carry a Master Out Slave In (MOSI) signal, a serial clock (SCLK) and a Master In Slave Out (MISO) signal, respectively, and can either function as inputs or outputs to either of the microprocessors 45 and 60. Pin 96 carries a reset signal (SBRES) from the electronics microprocessor 60 and is an input to the sensor microprocessor 45. Pin 98 carries an interrupt signal (IRQ) from sensor microprocessor 45 to the electronics microprocessor 60 that indicates that data is available for transfer to the electronics microprocessor 60 and is an output from the sensor microprocessor 45. Pin 100 carries handshake signal 1 (HS1) from the sensor microprocessor 45 and is an output from the sensor microprocessor 45. Pin 102 carries handshake signal 2 (HS2) from the electronics microprocessor 60 and is an input to the sensor microprocessor 45. Within sensor module 15, sensor microprocessor 45 shares use of the interface connector 55 with analog-to-digital converter 40 and sensor module memory 50.

2. Major Component Overview of the Communication Protocol

Sensor microprocessor 45 uses a handshake communication protocol to communicate data and status to and from the electronics microprocessor 60. Seven pins, MOSI pin 90, SCLK pin 92, MISO pin 94, SBRES pin 96, IRQ pin 98, HS1 pin 100, and HS2 pin 102, participate in the communication protocol. Preferably, all data is transferred between the sensor module 15 and the electronics module 20 along pins 90–102.

HS2 is a logic signal driven by the electronics microprocessor 60 and monitored by the sensor microprocessor 45. The HS2 signal is used to initiate communications from electronic microprocessor 60 to sensor microprocessor 45. After such communication is initiated, HS2 serves as a synchronizing signal. In operation, when electronics microprocessor 60 wishes to initiate communications with the sensor microprocessor 45, electronics microprocessor 60 asserts the HS2 signal. Sensor microprocessor 45 periodically checks the state of the HS2 pin 102. When sensor microprocessor 45 detects that the HS2 signal has been asserted, sensor microprocessor 45 responds by sending an HS1 signal (described below) to the electronics microprocessor 60 on the HS1 pin 100.

HS1 is another logic signal driven by sensor microprocessor 45 on the HS1 pin 100. The HS1 signal is primarily used to provide a synchronizing signal to electronics microprocessor 60.

IRQ is a second logic signal driven by the sensor microprocessor 45. IRQ is used to initiate communications from the sensor microprocessor 45 to the electronics microprocessor 60 by creating an electronics microprocessor interrupt. In operation, when the sensor microprocessor 45 wishes to initiate a communication session with electronics microprocessor 60, the sensor microprocessor sends the IRQ signal on the IRQ pin 98. Sensor microprocessor 45 then waits until the electronics microprocessor 60 responds to the IRQ signal by lowering and then raising the HS2 signal on the HS2 pin 102.

The signals SCLK, MISO, and MOSI are used to transfer data along the SCLK pin 92, MISO pin 94 and MOSI pin 90, respectively, and are part of a serial peripheral interface (SPI) bus 103. The SPI bus 103 is incorporated in the microprocessors 45 and 60 and the sensor module memory 50, and preferably supports full-duplex, three-wire synchronous transfer of data. The microprocessors 45 and 60 simultaneously transmit and receive serial data along separate pins during each transfer.

The serial nature of the data transfer is a preferred aspect of the invention as it minimizes power consumption and reduces complexity of the interface 55.

3. Communication Protocol Details

A. Registers and Commands

The SPI bus 103 is used to transfer data between the microprocessors 45 and 60. Preferably, the microprocessors 45 and 60 (as with the SPI bus 103) support full duplex, three-wire transfer of data. Typically, when transfer of data occurs, an 8 bit word is shifted out on one data pin (e.g., SCLK 92, MISO 94 or MOSI 90) while a second word is simultaneously shifted in on another data pin. Data is shifted in or out on MISO 94 or MOSI 90 through the action of the SCLK signal. Each clock pulse of the SCLK signal preferably shifts one bit. Three registers in the microprocessors 45 and 60 interface with the SPI bus 103: the SPI control register (SPCR), the SPI status register (SPSR), and the SPI data register (SPDR). These registers are preferably integral with microprocessor 45 and 60.

When a transfer of data occurs, an eight bit word is serially shifted out of one microprocessor's SPDR register and simultaneously shifted in on the other microprocessor's SPDR register. The SPSR contains a number of flags that can indicate the status of the data or the transfer of data.

The Serial Peripheral interface Control Register (SPCR) is located in microprocessors 45 and 60 and interfaces with the SPI bus 103. Table 1 describes each bit in the SPCR register for the M68HC11 microprocessor.

TABLE 1

| Bit No. | Bit Name | Description |
|---|---|---|
| Bit 7 | SPIE | 0 = SPI interrupts are disabled. |
| Bit 6 | SPE | 1 = SPI system is turned on. |
| Bit 5 | DWOM | 0 = Port D outputs are push-pull. |
| Bit 4 | MSTR | 1 = Master |
|  |  | 0 = Slave. |
| Bit 3 | CPOL | 1 = Active low clock. |
|  |  | 0 = Active high clock. |
| Bit 2 | CPHA | Selects clock phase. |
| Bit 1 | SPR1 | Selects bit rate when MSTR = |
| Bit 0 | SPR0 | Master. |

Table 2 below lists commands required for the electronics microprocessor 60 to communicate with the sensor module 15 during power-up initialization. These commands are codes that are sent from electronics microprocessor 60 to sensor module 15 on the SPI bus 103 to make the sensor module 15 perform certain actions or return certain data. (Use of command 128 is described in further detail below in the section on the INDEXED_READ procedure.)

TABLE 2

| Command Number (and hex value) | Function |
|---|---|
| 0 (00H) | Set sensor EEPROM chip select to zero. This disables read and write to the sensor EEPROM. |
| 1 (01H) | Set sensor EEPROM chip select to one. This enables read and write to the sensor EEPROM. |
| 2 (02H) | Go into power-up mode. Once in power-up mode, a second command 2 is required to exit power-up mode. |
| 3 (03H) | Reserved. |
| 4 (04H) | Set Sensor Module to high resolution mode. |
| 5 (05H) | Reserved. |
| 128 (80H) | Indexed read of EEPROM (See following table for further details). |

Table 3 below lists the indices support for command 128 from table 2.

TABLE 3

| Index | Description |
|---|---|
| 0 | Sensor Module software revision. |
| 1 | Reserved. |
| 2 | Number of Process Variables (PVs) |

TABLE 3-continued

| Index | Description |
|---|---|
|  | supported. |
| 3 | Types of PVs and their order is: |
|  | 0 = DP |
|  | 1 = AP |
|  | 2 = PT |
| 4 | Number of EEPROM addresses available when using index 5. |
| 5 | EEPROM absolute addresses. |
|  | Starting address of trim constants. |
|  | Starting address of IEEE conversion. |
|  | Sensor serial number and transmitter type code. |
|  | Module materials (isolator, fill fluid). |
|  | Materials of construction. |
| 6 | Reserved. |

B. Communication Functions

The communication protocol comprises several software procedures. The sensor microprocessor 45 and the electronics microprocessor 60 preferably each have a plurality of individually controllable output pins for their respective signal-out lines on interface connector 55, a plurality of individually readable input pins for the signal-in lines on the interface connector 55, and an SPI bus 103 system.

The software procedures include a power-up initialization procedure used at system start-up to synchronize the microprocessors; a sensor update procedure used for electronics microprocessor 60 to read the signals representative of the process variables; a sensor data transfer procedure which can be done as part of the power-up initialization procedure; a receive SPI data byte procedure which causes the sensor microprocessor 45 to receive one byte of data from the SPI bus 103; a send SPI data byte (X) procedure which transmits a single byte of data from the sensor microprocessor 45 to the SPI bus 103; a send single command procedure which passes a command from electronics microprocessor 60 to sensor module 15; an indexed read procedure which sends a three byte sequence from the electronics microprocessor 60 to the sensor module, and sensor memory 50 sends one or more bytes of data to the electronics microprocessor 60 in response; and a read EEPROM direct procedure which causes the electronics microprocessor 60 to read the sensor module memory 50 at an address and causes the electronics microprocessor 60 to receive data from the specified address. Subprocedures, implemented as software subroutines, are preferably used to reduce repetition in the procedures.

Program listings of the procedures are disclosed below as pseudocode tables. The left side of the table comprises notes to clarify the corresponding description of the pseudocode on the right side of the tables. Description of the data terms used in the pseudocode tables follows this section.

1. POWER_UP_INITIALIZATION Procedure

The power-up initialization sequence is required at system start-up to synchronize electronics microprocessor 60 with sensor microprocessor 45 and to enable electronics microprocessor 60 to read necessary data from sensor module memory 50. The above function is further illustrated by the following pseudocode listed in Table 4.

TABLE 4

| Notes | Description |
|---|---|
| Comment | 1. Controller reset occurs. Controller processing starts. |
| Comment | 2. Perform local initialization functions as required. This section should be short so that step 4, is performed as early as possible. Initialization can continue in step 7. |
| Required | 3. De-assert the local Slave Select pin if this is not already performed in hardware. |
| Required | 4. Set SBRES low. This will force the Sensor Module into reset state. |
| Required | 5. Set HS2 low. |
| User Option | 6. Mask interrupts. |
| User Option | 7. Continue with local initialization. |
| Required | 8. spcr = 54H. |
| Required | 9. Do procedure Send_spi_data_byte(0). This is dummy data to initialize the SPI registers. |
| Required | 10. spcr = 44H. |
| Required | 11. Set SBRES high. This will start the Sensor Module processing. |
| Required | 12. Wait for HS1 to go high. To do this, use a software loop to monitor the HS1 pin and exit when it goes high. |
| User Option | 13. In the preceding step an optional timer or loop counter may be used while waiting for HS1, to limit the wait time, in case of a hardware malfunction. Wait for HS1 up to 60 ms before giving up. |
| Required | 14. Wait for HS1 to go low. Do the next step within 5 ms after HS1 goes low. |
| Required | 15. Do procedure sensor_data_transfer. |
| User Option | 16. Perform local tests as desired on the data just acquired. Refer to Description of Data section. |
| User Option | 17. Unmask interrupts. |
| Required | 18. spcr = 44H. |
| User Option | 19. Continue local processing. |

2. SENSOR_UPDATE Procedure

A SENSOR_UPDATE procedure is used for the electronics microprocessor 60 to read the signals representative of the process variables. The SENSOR_UPDATE procedure preferably occurs every 108 milliseconds (ms) during normal operation of the transmitter 10, which occurs after the POWER_UP_INITIALIZATION procedure is completed. The SENSOR_UPDATE procedure is initiated by the sensor microprocessor 45 when it asserts an IRQ signal on the IRQ pin 98. The IRQ signal alerts electronics microprocessor 60 that sensor microprocessor 45 is ready to deliver information regarding the process variables. The electronics microprocessor 60 responds to the IRQ signal by outputting an HS2 signal on the HS2 pin 102. Thereafter, the SENSOR_UPDATE procedure causes sensor microprocessor 45 to transfer data regarding the process variables to the electronics microprocessor 60. The above function is further illustrated by the pseudocode in Table 5.

TABLE 5

| Notes | Description |
|---|---|
| Required | 1. Set HS2 low. |

TABLE 5-continued

| Notes | Description |
|---|---|
| Required | 2. Short delay. Minimum 50 microsec. |
| Required | 3. Set HS2 high. |
| Required | 4. Wait for HS1 to go high. This is a loop that monitors the HS1 pin and exits when it goes high. |
| Required | 5. spcr = 54H. |
| Required | 6. Use procedure receive_spi_byte to receive 11 bytes of data from the SPI bus. Call this procedure once for each byte to be received. |
| | ● Store the 1st 3 bytes returned as corrected_dp. |
| | ● Store the 2nd 3 bytes returned as corrected_ap. |
| | ● Store the 3rd 3 bytes returned as corrected_pt. |
| | ● Store the 10th byte returned as corrected_st most significant byte. |
| | ● Store the 11th byte returned as corrected_st middle significant byte. |
| Required | 7. Set HS2 low. |
| Required | 8. Use procedure receive_spi_data_byte to receive 1 more byte of data. |
| | ● Store the 12th byte returned as corrected_st least significant byte. |
| Required | 9. spcr = 44H |
| User Option | 10. Perform tests on the process variables. |
| Required | 11. Calculate scaled process variables. Refer to Conversion of Process Variables section. |
| Comment | 12. The two preceding steps (testing and scaling) can be done outside the interrupt if desired. |
| User Option | 13. Return from interrupt. |

3. SENSOR_DATA_TRANSFER Procedure

A SENSOR_DATA_TRANSFER procedure is preferably done as part of the POWER_UP INITIALIZATION procedure to transfer data from sensor module memory 50 to electronics microprocessor 60. The SENSOR_DATA_TRANSFER procedure begins with a command which causes the sensor module 15 to power-up. This function is illustrated by the pseudocode of Table 6.

TABLE 6

| Notes | Description |
|---|---|
| User Option | Mask interrupts. |
| Required | Function: Enter Power-up Mode (Command 2) Do procedure send_single_command(2). |
| Required | Function: High Resolution Mode (Command 4) Do procedure send_single_command(4). |
| Optional | Function: HC05 Software Revision (Command 128 Index 0) Do procedure indexed_read(0,1,ADDR). One byte of data will be stored by the called procedure: ● Name this byte hc05_soft_rev. |
| Optional | Function: Number of PVs Supported (Command 128 Index 2) Do procedure indexed_read(2,1,ADDR). One byte of data will be stored by the called procedure: ● Name this byte number_of_pvs |
| Optional | Function: Types of PVs Supported (Command 128 Index 3) Do procedure indexed_read(3,3,ADDR). |

TABLE 6-continued

| Notes | Description |
|---|---|
| | Three bytes of data will be stored by the called procedure:<br>● Name the 1st byte first_pv_type.<br>● Name the 2nd byte second_pv_type.<br>● Name the 3rd byte third_pv_type. |
| Required | Function: Number of EEPROM Addresses Available (Command 128 Index 4)<br>Do procedure indexed_read(4,1,ADDR).<br>One byte of data will be stored by the called procedure:<br>● Name this byte number_of_addr. |
| Required | Function: List of EEPROM Absolute Addresses (Command 128 Index 5)<br>Do procedure indexed_read(5,5,ADDR).<br>Five bytes of data will be stored by the called procedure.<br>● Name the 1st byte ad_trim_const.<br>● Name the 2nd byte ad_ieee_conv.<br>● Name the 3rd byte ad_txtype_ser_numb.<br>● Name the 4th byte ad_mod_materials.<br>● Name the 5th byte ad_mod_flange. |
| Required | Function: Read IEEE Conversion Factors<br>Do procedure read_eeprom_direct-(ad_ieee_conv,24,M_ADDR).<br>Twenty four bytes of data will be stored by the called procedure:<br>● Name the 1st 4 bytes dp_ieee_-full_scale.<br>● Name the 2nd 4 bytes ap_ieee-full-scale.<br>● Name the 3rd 4 bytes pt_ieee-full-scale.<br>● Name the 4th 4 bytes dp_ieee-recip.<br>● Name the 5th 4 bytes ap_ieee-recip.<br>● Name the 6th 4 bytes pt_ieee-recip. |
| Optional | Function: Read Sensor Serial Number and Transmitter Type Code<br>Do procedure read_eeprom_direct-(ad_txtype_ser_numb, 4, M_ADDR).<br>● Name the 1st byte txtype.<br>● Name the next 3 bytes ser_numb. |
| Optional | Function: Read Module Materials of Construction<br>Do procedure read_eeprom_direct-(ad_mod_materials, 2, M_ADDR).<br>● Name the 1st byte module_isolator.<br>● Name the 2nd byte module_fill-_fluid. |
| Optional | Function: Read Materials of Construction<br>Do Procedure read_eeprom_direct-(ad_mod_flange, 8, M_ADDR).<br>● Name the 1st byte flange_material.<br>● Name the 2nd byte flange_type.<br>● Name the 3rd byte drain_vent.<br>● Name the 4th byte o_ring_gasket.<br>● Name the 5th byte remote_seal_type<br>● Name the 6th byte remote_seal_fill<br>● Name the 7th byte remote_seal_-isolator<br>● Name the 8th byte number_remote_-seals. |
| Required | Function: Exit Power-up Mode (Command 2)<br>Do procedure send_single_command(2). |
| User Option | Unmask interrupts. |
| Comment | End of procedure. |

4. RECEIVE_SPI_DATA_BYTE Procedure

The RECEIVE_SPI_DATA_BYTE procedure causes electronics microprocessor 60 to receive one byte of data from the SPI bus 103. The RECEIVE_SPI_DATA-BYTE procedure is further illustrated by the pseudocode in Table 7.

TABLE 7

| Notes | Description |
|---|---|
| Required | 1. If this procedure takes less than 180 microsec. add delay here to make the total equal 180 microsec. This allows time for Sensor Module to load data to its SPI data register. |
| Required | 2. spdr = 0. |
| Label | 3. Begin loop. |
| Required | 4. If bit 7 of spsr is equal to zero go to 'begin loop'. |
| Required | 5. Read byte from spdr and return it. |
| Comment | 6. End of procedure. |

5. SEND_SPI_DATA_BYTE(X) Procedure

The SEND_SPI_DATA_BYTE (X) procedure transmits a single byte of data, indicated as X from the electronics microprocessor 60 to the SPI bus 103 and sensor microprocessor 45. Bit 7 of the SPSR register goes high to indicate that the byte has been transmitted on the bus. The above function is illustrated by the following pseudocode in Table 8.

TABLE 8

| Notes | Description |
|---|---|
| Required | 1. If this procedure takes less than 150 microsec. add delay here to make the total equal 150 microsec. This allows time for Sensor Module to store the previous byte of data received in its SPI data register. |
| Required | 1. spdr = X |
| Label | 2. Begin loop. |
| Required | 3. If bit 7 of spsr is equal to zero go to 'begin loop'. |
| Comment | 4. End of procedure. |

6. SEND_SINGLE_COMMAND(CMD) Procedure

The SEND_SINGLE_COMMAND (CMD) procedure passes a command, indicated as CMD, from the electronics microprocessor 60 to the sensor module 15. CMD is a command number from the command list in Table 2, above. This function is illustrated by the pseudocode of Table 9.

TABLE 9

| Notes | Description |
|---|---|
| Required | 1. Set HS2 high. |
| Required | 2. Wait for HS1 to go high. To do this, use a software loop to monitor the HS1 pin and exit when it goes high. |
| User Option | 3. In the preceding step an optional timer or loop counter may be used while waiting for HS1, to limit the wait time, in case of a hardware malfunction. Wait for HS1 up to 5 millisec. before giving up. |
| Required | 4. spcr= 54H. |
| Required | 5. Do procedure send_spi_data_byte(CMD) |
| Required | 6. Set HS2 low. |

TABLE 9-continued

| Notes | Description |
|---|---|
| Required | 7. spcr = 44H. |
| Comment | 8. End of procedure. |

7. INDEXED_READ(INDX, NUM, ADDR) Procedure

The INDEXED_READ procedure sends a three byte sequence from the electronics microprocessor 60 to the sensor module 15, and the sensor memory 50 sends one or more bytes of data to the electronics microprocessor 60 in response. The variable INDX is the index number for command number 128 as indicated in Table 3. The variable NUM is the number of variables to be received for INDX. The variable ADDR is the address of the electronics memory 65 wherein the process variables received by the electronics microprocessor 60 will be stored. The variables INDX and NUM are specified when the INDEXED_READ procedure is called, however, the variable ADDR must be assigned by the user of the system. The above function is further illustrated by the pseudocode in Table 10.

TABLE 10

| Notes | Description |
|---|---|
| Required | 1. Set HS2 high. |
| Required | 2. Wait for HS1 to go high. This is a loop that monitors the HS1 pin and exits when it goes high. |
| User Option | 3. In the preceding step an optional timer or loop counter may be used while waiting for HS1, to limit the wait time, in case of a hardware malfunction. Wait for HS1 up to 5 millisec. before giving up. |
| Required | 4. spcr = 54H. |
| Required | 5. Do procedure send_spi_data_byte(128) |
| Required | 6. Do procedure send_spi_data_byte-(INDX) |
| Required | 7. Do procedure send_spi_data_byte-(NUM) |
| Required | 8. Sent HS2 low. |
| Required | 9. Wait 0.35 millisec minimum before proceeding to the next step. |
| Required | 10. Use procedure receive_spi_byte. Store bytes starting at address ADDR. Continue receiving and storing bytes until NUM bytes have been received. |
| User Option | 11. In the preceding step monitor HS1 before receiving each byte. This will detect any hardware or software problems that might be present. HS1 low indicates an error. |
| Required | 12. spcr = 44H. |
| Comment | 13. End of procedure. |

8. READ_EEPROM_DIRECT(E_ADDR, SIZE, M_ADDR) Procedure.

The READ_EEPROM_DIRECT procedure causes the electronics microprocessor 60 to read the sensor module memory 50 at the variable address E_ADDR and causes the electronics microprocessor 60 to receive data from the specified address of the sensor module memory 50. The variable SIZE specifies the number of bytes of data to be received by the electronics microprocessor 60. The variable M_ADDR is the address of the location in the RAM 70 where the received data is to be stored. The variables E_ADDR and SIZE are specified in the procedures above when the READ_EEPROM_DIRECT procedure is called. The variable M_ADDR, however, must be assigned by the user. This procedure is illustrated by the pseudocode of Table 11.

TABLE 11

| Notes | Description |
|---|---|
| Label | 1. Begin loop. |
| Required | 2. Do procedure send_single_command(1). This will cause the EEPROM chip select to be asserted. |
| Required | 3. spcr = 50H. |
| Comment | 4. From this point until the next comment the SPI bus communications go directly to the EEPROM, not the microprocessor, as in all the other procedures. |
| Required | 5. Do procedure send_spi_data_byte(6). This is the EEPROM read instruction. |
| Required | 6. Do procedure send_spi_data_byte-(E-ADDR). This tells the EEPROM address to read from. |
| Required | 7. spcr = 54H. |
| Required | 8. Do procedure receive_spi_data_byte. Store this byte at M_ADDR. |
| Required | 9. Do procedure receive_spi_data_byte. Store this byte at M_ADDR+1. |
| Required | 10. Add 1 to E_ADDR. Subtract 2 from SIZE. Add 2 to M_ADDR. |
| Required | 11. Go to 'Begin loop' above. Continue looping until SIZE equals zero. |
| Comment | 12. This is the end of direct EEPROM communication. From now on the SPI communication will go to the Sensor Module microprocessor. |
| Required | 13. Do procedure send_single_command (0). This will cause the EEPROM chip select to be de-asserted. |
| Required | 14. spcr = 44H. |
| Comment | 15. End of procedure. |

Note that for each loop of this procedure, two bytes of data are received. The sensor module memory 50 is addressed by words, and therefore the variable E_ADDR preferably increases by one for each loop. The variable SIZE is in bytes so it preferably decreases by two for each loop. The variable M_ADDR is in bytes so it preferably increases by two for each loop.

C. Description of Data

The data items referenced in the above procedures are listed below. All data is preferably stored in the sensor module memory 50 with the most significant byte at the lowest memory address. Also, all data is preferably transferred from the sensor module 15 with the lowest memory addressed first and therefore will be received by the electronics microprocessor 60 with the most significant byte of the data arriving first.

Data regarding the process variable includes CORRECTED_DP, CORRECTED_AP, CORRECTED_PT, and CORRECTED_ST. The data CORRECTED_DP is a three byte unsigned integer. The data is used to describe linearized, temperature compensated, differential pressure. In use, CORRECTED_DP must be converted to SCALE_DP at which time it becomes the final differential pressure process variable.

The data CORRECTED_AP is also a three byte unsigned integer. It describes corrected line pressure. The CORRECTED_AP data must be converted to SCALED_

AP data at which time the SCALED_AP data becomes the final absolute pressure process variable. The CORRECTED_AP data preferably includes error conditions that indicate whether the sensor module 15 detected an out of range condition in the raw sensor data or whether the absolute pressure sensor 30 detected an open bridge.

The data CORRECTED_PT is a three byte unsigned integer which describes the process temperature. In use, the CORRECTED_PT data must be converted to SCALED_PT data at which time the SCALED_PT data becomes the final temperature process variable. CORRECTED_PT data includes an error condition which indicates that the process temperature sensor 35 has detected an out of range low condition in the raw sensor data.

The CORRECTED_ST data is a three byte unsigned integer indicative of the sensor temperature. The sensor temperature is not a process variable even though it is included as one of the items output in the SENSOR_UPDATE procedure. Sensor temperature is preferably used only for maintenance and trouble shooting.

The HCO5 software revision data used in the SENSOR_DATA_TRANSFER procedure is a one byte unsigned integer describing a software revision. The NUMBER_OF_PVS data is a one byte unsigned integer describing the number of process variable types available when using index 3. Preferably, the number of process variable types is three. The data regarding the types of process variables supported include FIRST_PV_TYPE, SECOND_PV_TYPE, and THIRD_PV_TYPE.

The data FIRST_PV_TYPE is a one byte unsigned integer describing the first type of process variable. This number is "zero" when representing the differential pressure variable. The data SECOND_PV_TYPE is a one byte unsigned integer describing the second type of process variable. This number is "one" when representing the absolute pressure variable. The data THIRD_PV_TYPE is a one byte unsigned integer which describes the third type of process variable. This number is "two" when representing the process temperature variable. The data NUMBER_OF_ADDR is a one byte unsigned integer describing the number of sensor module memory 50 addresses available when using an index 5 from Table 3.

The data AD_IEEE_CONV is a one byte unsigned integer which describes the starting address of the IEEE conversion constants in the sensor module memory 50. The data AD_IEEE_CONV is used to retrieve IEEE conversion constants. The data ADD_TXTYPE_SER_NUMB is a one byte unsigned integer which describes the starting address of the transmitter type code and the sensor serial number in the sensor module memory 50. Data AD_MOD_MATERIALS and AD_MOD_FLANGE are also one byte unsigned integers which describe the starting address of the module materials of construction data in the sensor module memory 50. It is used to retrieve module materials of construction data.

The IEEE conversion factor data includes DP_IEEE_FULL_SCALE, AP_IEEE_FULL_SCALE, PT_IEEE$_{13}$_FULL_SCALE, DP_IEEE_RECIP, AP_IEEE_RECIP, and PT_$_{IEEE}$_RECIP which are all four byte IEEE-754 floating point data types. The DP_IEEE_FULL_SCALE describes the full scale value of differential pressure in inches of water at 60° F. This data is used in an equation which calculates the scaled differential pressure process variable. The data AP_IEEE_FULL_SCALE describes the full scale value of absolute pressure in inches of water at 60° F. This number is used in an equation which calculates the scaled absolute pressure process variable. The data PT_IEEE_FULL_SCALE describes the full scale value of process temperature in degrees Kelvin. This data is used in an equation which calculates the scaled process temperature variable. It is also used in an equation which calculates the scale sensor temperature.

The data DP_IEEE_RECIP is the reciprocal of the DP_IEEE_FULL_SCALE data. This data can be used to verify DP_IEEE_FULL_SCALE data. The data AP_IEEE_RECIP describes the reciprocal of the data AP_IEEE_FULL_SCALE and can be used to verify the AP_IEEE_FULL_SCALE data. The data PT_IEEE_RECIP describes the reciprocal of the data PT_IEEE_FULL_SCALE and can be used to verify the PT_IEEE_FULL_SCALE data.

The data referring to the module materials of construction, including MODULE_ISOLATOR and MODULE_FILL_FLUID, and data referring to the materials of construction, including FLANGE_MATERIAL, FLANGE_TYPE, O_RING_GASKET, REMOTE_SEAL_TYPE, REMOTE_SEAL_FILL, REMOTE_SEAL_ISOLATOR, and NUMBER_REMOTE_SEALS refer to data used in a protocol which communicates between the communicator 75 and the remote location 80.

4. Operational Examples

FIGS. 3–7 are operational examples of the communication protocol in the form of timing diagrams which describe the hand shake protocol and data transfer between electronics microprocessor 60 and sensor microprocessor 45.

A. Power-up Sequence Timing Diagram

A power-up sequence timing diagram shown in FIG. 4 wherein the signal for SBRES is shown at 210, the HS1 signal is shown at 212, the HS2 signal is shown at 214, and the SPI bus 103 activity is shown at 216. Power is applied to the transmitter 10 at 218. The electronics microprocessor reset occurs and electronics microprocessor 60 begins processing. The electronics microprocessor 60 asserts an SBRES signal to maintain sensor microprocessor 45 in reset mode. Electronics microprocessor 60 continues with its initialization. At time 220 electronics microprocessor 60 is finished with its initialization and de-asserts the SBRES signal which allows sensor microprocessor 45 to begin processing. Electronics microprocessor 60 then waits for an HS1 signal. Sensor microprocessor 45 meanwhile takes control of the SPI bus 103 at 222 and transfers data from the sensor module memory 50 to sensor microprocessor 45, which takes typically 60 ms.

When sensor microprocessor 45 is completed with its initialization, sensor microprocessor 45 sends a high HS1 at 224 signal to electronics microprocessor 60. After sensor microprocessor 45 sets the HS1 signal low, sensor microprocessor 45 waits for the HS2 signal from electronics microprocessor 60.

HS1 goes low at 226 approximately 0.3 ms after it goes high at 224. HS2 goes approximately five ms after HS1 goes low at 226. Events 228 through 234 describe the SENSOR_DATA_TRANSFER procedure. When HS2 goes high at 228, the electronics microprocessor 60 starts the SENSOR_DATA_TRANSFER procedure. As soon as sensor microprocessor 45 detects HS2 high, sensor microprocessor 45 executes a software interrupt instruction to handle electronics microprocessor 60 request for data.

Events 230 through 232 can be one of the SEND_SINGLE_COMMAND, INDEXED_READ or READ_

EEPROM_DIRECT procedures. Electronics microprocessor 60 sends a series of commands to the sensor microprocessor 45 to transfer data from sensor module memory 50 to sensor microprocessor 45 as indicated at 230. When all of the data is transferred (indicated at 232) electronics microprocessor 60 sets HS2 low at 234, and both microprocessors 45 and 60 start normal operation.

B. SPI System Activity Within a 108 ms Sensor Update Cycle

FIG. 3 describes the SPI bus 103 activity within the 108 ms sensor update cycle. Preferably, the cycle repetition rate is 108 ms. The preferred tolerance is plus or minus 2% over the voltage and temperature operating ranges. The cycle is initiated by the analog-to-digital converter 40 when it activates a hardware interrupt to the sensor microprocessor 45. Sensor microprocessor sends an IRQ signal which activates an interrupt to electronics microprocessor 60. The analog-to-digital interrupt at 200 is the beginning of each cycle and occurs after the POWER_UP_INITIALIZATION procedure is completed. Electronics microprocessor 60 responds to the IRQ signal and completes the SENSOR_UPDATE procedure during the early part of the cycle, as described. This allows time for the sensor microprocessor 45 and the electronics microprocessor 60 to complete processing before the next analog-to-digital converter interrupt.

At the beginning of the cycle, indicated at 200, the sensor microprocessor 45 receives an interrupt signal from the analog-to-digital converter 40. Thereafter, during a period indicated at 202, the analog-to-digital converter 40 sends raw sensor data to the sensor microprocessor 45. Period 202 also includes an interrupt latency of sensor microprocessor 45 after the analog-to-digital interrupt 200, and an interrupt latency of the electronics microprocessor 60 after activation of an IRQ signal from the sensor microprocessor 45. Time period 202 is approximately 1 ms. During this time 202, sensor microprocessor 45 acts as a master and electronics microprocessor 60 acts as a slave.

Thereafter, during time period 204, sensor module 15 and electronics microprocessor 60 work together to transfer linearized data from sensor microprocessor 45 to electronics microprocessor 60 from the previous sensor usage cycle. Time period 204 lasts approximately 3 ms wherein the electronics microprocessor 60 acts as the master to the sensor microprocessor 45 which acts as the slave. Time periods 202 through 204 identify the time used for the SENSOR_UPDATE procedure.

During time period 206, sensor module memory 50 sends temperature coefficients to sensor microprocessor 45. Also, during time period 206, sensor microprocessor 45 uses the SPI bus 103 and acts as the master, and the sensor microprocessor 45 accesses the sensor memory 50. This is internal to the sensor module 15 and the time is available for the electronics module 20 to process data. During time period 208, sensor module 15 does background processes and the time is available for the electronics module 20 to process data.

Sensor microprocessor 45 waits for the electronics microprocessor to respond with an HS2 signal after sensor microprocessor 45 initiates the IRQ signal. Preferably, analog-to-digital interrupts to sensor module 15 are not stacked. In the extreme case that electronics microprocessor 60 is delayed in its response to the IRQ signal longer than the cycle, the linearized data would be lost until the proper synchronization is re-established.

C. Sensor Update Timing Diagram

FIG. 5 shows a timing diagram for the SENSOR_UPDATE procedure wherein the IRQ signal is indicated at 236, the HS2 signal is indicated at 238, the HS1 signal is indicated at 240, and the SPI bus 103 activity is indicated at 242. Sensor microprocessor 45 asserts an IRQ signal at 244 to interrupt electronics microprocessor and alert electronics microprocessor 60 that a sensor update is coming at 246. The sensor microprocessor 45 then monitors the HS2 pin for a low and high signal sequence. After the HS2 signal goes low, a delay of at least 50 microseconds occurs before setting the HS2 signal high (indicated at 246). Electronics microprocessor 60 now waits for the HS1 signal to go high. Sensor microprocessor takes control of the SPI bus 103 at 248 and transfers raw sensor data from the sensors to sensor module 15 (indicated generally at 250). Sensor microprocessor 45 then sets the HS1 signal high 252 to indicate that the sensor microprocessor 45 is ready to transfer data.

The electronics microprocessor 60 acts as the SPI master and transfers the compensated processed variables from the sensor microprocessor 45 to the electronics microprocessor 60. Sensor microprocessor 45 transfers three bytes each of differential pressure, absolute pressure, process temperature and sensor temperature to electronics microprocessor 60. The transfer is indicated generally at 254. After the sixth byte is transferred at 256, sensor microprocessor 45 lowers the HS1 signal at 258. After the seventh byte is transferred at 260, the sensor microprocessor 45 de-asserts the IRQ signal at 262. After the eleventh byte is transferred at 264, the electronics microprocessors lowers the HS2 signal at 266. After the twelfth byte is transferred at 268, the sensor module de-asserts the slave mode.

D. Indexed Read of Sensor Module Timing Diagram

FIG. 6 shows a timing diagram of the INDEXED_READ procedure wherein signal HS2 is indicated at 270, HS1 is indicated at 272, and the SPI bus 103 activity is indicated at 274. As discussed above, sensor microprocessor 45 periodically polls for the HS2 signal. When sensor microprocessor 45 detects the HS2 signal high at 276, it executes a software interrupt instruction to handle the request from electronics microprocessor 60. Sensor microprocessor 45 responds to the high HS2 signal by setting the HS1 signal high at 278. The time period between sensor microprocessor 45 detecting the HS2 signal high at 276 and asserting the HS1 signal high at 278 is approximately 5 ms. After detecting the HS1 signal high at 278, electronics microprocessor 60 sends a command, an index, and byte count, indicated at 280. Electronics microprocessor 60 sets the HS2 signal low at 282 to indicate that the command, index, and byte count bytes have been sent. Electronics microprocessor 60 waits approximately 0.35 ms to allow the sensor microprocessor 45 to prepare data for transmitting to the electronics microprocessor 60. Sensor microprocessor 45 thereafter transmits the requested data at 284 to electronics microprocessor 60. When all of the bytes have been sent at 286 to electronics microprocessor 60, sensor microprocessor 45 lowers the HS1 signal to indicate that all the bytes have been sent at 288.

E. Read EEPROM Direct Timing Diagram

FIG. 7 shows a READ_EEPROM_DIRECT timing diagram wherein the HS2 signal is indicated at 290, the HS1 signal is indicated at 292, and the SPI bus 103 signal activity is indicated at 294. Events 296 through 306 define the SEND_SIGNAL_COMMAND procedure. When sensor microprocessor detects the HS2 signal high at 296, sensor microprocessor 45 executes a software interrupt instruction to handle the request from the electronics microprocessor 60. Sensor microprocessor 45 sets the HS1 signal high at 298 to instruct the electronics microprocessor 60 that the sensor microprocessor 45 is ready to receive a command. The electronics microprocessor 60 responds by sending command "1" at 300 which instructs sensor microprocessor 45 to assert EEPROM chip select, as indicated in Table 2. The electronics microprocessor 60 sets HS2 signal low at 304 to indicate it has finished sending the command. Sensor microprocessor 45 responds by setting the HS1 signal low at 306 wherein sensor microprocessor 45 is now in a passive mode and all communications go directly to the sensor module memory 50.

Electronics microprocessor 60 sends the EEPROM read instruction which tells the EEPROM it is ready to receive a word of data at 308. Electronics microprocessor 60 then sends the EEPROM address which is addressed in words at 310. The sensor module memory then sends the electronic microprocessor the first and second byte of a requested word at 312. The sequence 308 through 312 is repeated for each word of data to be transferred.

The SEND_SINGLE-COMMAND procedure is then repeated 314. The command "0" is sent 316 which instructs sensor microprocessor 45 to de-assert the EEPROM chip select.

F. Partial Listing of Advantages of the Present Invention

The previously described versions of the present invention have many advantages, including providing an intermicro communication protocol that is operable with several combinations of sensor and electronics modules in a multi-variable transmitter. The protocol operates using the existing interface, which allows retention of the ten pin interface between the sensor module and the electronics module.

The protocol has flexibility to maintain backwards and forwards compatibility. In other words, the pin definitions on the ten pin interface are identical to previously existing sensor module tables. Also, because the sensor module memory contains data concerning the idiosyncracies of the sensor module, the protocol can be amended to accommodate a wide and flexible range of scenarios. For example, the process variables can be of any type, number, and order. The electronics microprocessor can directly access the sensors if necessary. Also, the electronics microprocessor can alter the speed of the SPI bus 103 to accommodate for slower sensor modules.

The protocol allows the electronics microprocessor to access devices connected to the serial peripheral interface on the sensor module without running chip selects to those devices across the ten pin interface thus conserving hardware resources. The protocol allows the electronics microprocessor to access data on the sensor module without having to maintain memory maps of RAM, ROM and EEPROM. The electronics microprocessor can read/write data directly to improve throughput and for testing purposes. The protocol provides a vast throughput so that normal data exchanges occur in the time allocated between sensor interrupts, wherein many data exchanges involve only one byte.

Although the present invention has been described with reference to preferred embodiments, workers skilled in the art will recognize that changes may be made in form and detail without departing from the spirit and scope of the invention.

What is claimed is:

1. A method of communicating in a transmitter between a transmitter sensor microprocessor and a transmitter electronics microprocessor in a multi-processor transmitter environment wherein the microprocessors are connected by an interface having a bus system, the method comprising the steps of:

sending a first logic signal to the transmitter sensor microprocessor to initiate electronics module to sensor module communication;

responding to the first logic signal by sending a second logic signal to the transmitter electronics microprocessor, wherein the second logic signal also provides a first synchronizing signal to the transmitter electronics microprocessor;

transferring data from the transmitter sensor microprocessor to the transmitter electronics microprocessor during a selected time period after sending the second logic signal to the transmitter electronics microprocessor.

sending a third logic signal to the transmitter electronics microprocessor to initiate sensor module to electronics module communication and to force a transmitter electronics microprocessor interrupt;

responding to the transmitter electronics microprocessor interrupt by sending the first logic signal to the transmitter sensor microprocessor; and transferring data from the transmitter electronics microprocessor to the transmitter sensor microprocessor during the selected time period.

2. The method of claim 1 wherein the transmitter further comprises a memory operably connected to the transmitter sensor microprocessor, wherein the method further comprises the steps of:

resetting the transmitter sensor microprocessor during power-up;

up-loading data from the memory to the transmitter electronics microprocessor; and providing a second synchronizing signal to synchronize the transmitter electronics microprocessor with the transmitter sensor microprocessor after power-up.

3. A computer readable storage media containing a set of instructions, the set of instructions supporting a communications protocol operable in a multi-processor transmitter environment for controlling a plurality of transmitter modules including a sensor module and an electronics module, the set of instructions comprising:

a set of instructions formed into each of a plurality of procedures, the procedures comprising:
  a sensor update procedure;
  a receive data procedure;
  a send data procedure;
  a send command procedure;
  an indexed read procedure; and
  a read memory direct procedure.

4. The storage media of claim 3 wherein the plurality of procedures further comprises a power-up procedure.

5. The storage media of claim 4 wherein the power-up procedure includes a sensor data transfer procedure.

6. The storage media of claim 4 wherein the power-up procedure comprises:

instructions for causing the electronics module to reset the sensor module during power-up; and instructions for causing the electronics module to upload data from the sensor module and provide a signal to synchronize the electronics module with the sensor module after power-up.

7. The storage media of claim 3 wherein the sensor update procedure comprises:

instructions for causing synchronization between the sensor module and the electronics module; and instructions for causing the electronics module to read from the sensor module.

8. The storage media of claim 3 wherein the indexed read procedure comprises:

instructions for causing index data to be sent from the electronics module to the sensor module;

instructions for causing data representing a number of process variables to be sent from the electronics module to the sensor module; and instructions for causing the electronics module to store data regarding process variables in the electronics module.

9. The storage media of claim 3 wherein the read memory direct procedure comprises:

instructions for causing the electronics module to send a memory address to the sensor module;

instructions for causing the electronics module to send size data corresponding with an amount of memory data to the sensor module; and instructions for causing the sensor module to send the memory data to the electronics module.

10. A communication protocol operable in a multiprocessor transmitter environment including a sensor module having a transmitter sensor microprocessor and a sensor memory, the sensor module suitable for receiving process variables, and an electronics module having a transmitter electronics microprocessor wherein the transmitter sensor and electronics microprocessors each include a plurality of individually controllable output pins and a plurality of individually readable input pins, and wherein the transmitter sensor and electronics microprocessors are connected by an interface having a bus system, the communication protocol comprising:

instructions for causing synchronization between the transmitter sensor microprocessor and the transmitter electronics microprocessor and for causing the transmitter electronics microprocessor to read from the sensor memory;

instructions for causing the transmitter electronics microprocessor to read data indicative of at least one process variable from the sensor module;

instructions for causing the transmitter electronics microprocessor to send a first sequence of data representing index data and the process variables to the sensor microprocessor and for causing the transmitter sensor module to send memory data from the sensor memory to the transmitter electronics microprocessor;

instructions for causing the transmitter electronics microprocessor to send a second sequence of data representing sensor memory address data size to the sensor memory and for causing the sensor memory to send memory data to the electronics module.

11. An apparatus operable in a multiprocessor transmitter environment for controlling a plurality of transmitter modules connected by an interface, the apparatus comprising:

a plurality of pins connected to the interface;

a register corresponding with a single pin and operably coupled to the interface;

means for sending a first logic signal along the interface to a module and initiating communication between two modules;

means for synchronizing communication between the modules; and means for repeatedly transferring data between two modules and along the interface and between sensor interrupts.

12. The apparatus of claim 11 further comprising means for adapting the speed of the interface to accommodate individual requirements of the transmitter modules.

13. The method of claim 1 wherein the step of transferring data includes transferring data from the transmitter sensor microprocessor to the transmitter electronics microprocessor serially.

* * * * *